Fig. 1 — Settling characteristics of $CaCO_3$ Solids formed in Reaction Vessel

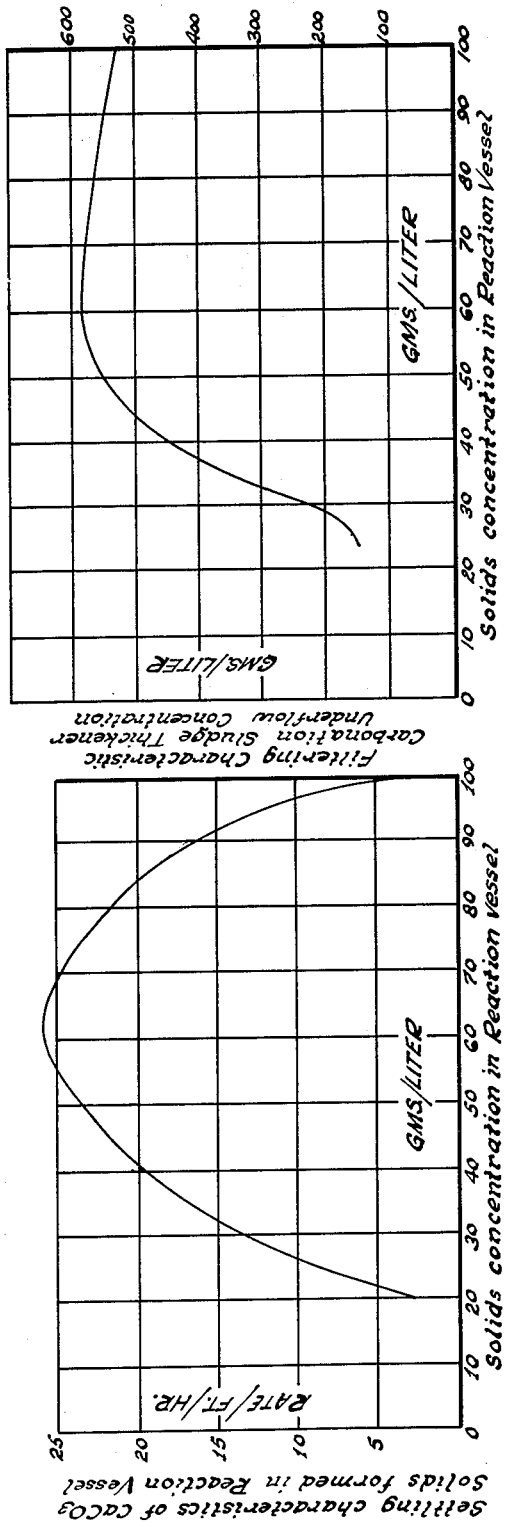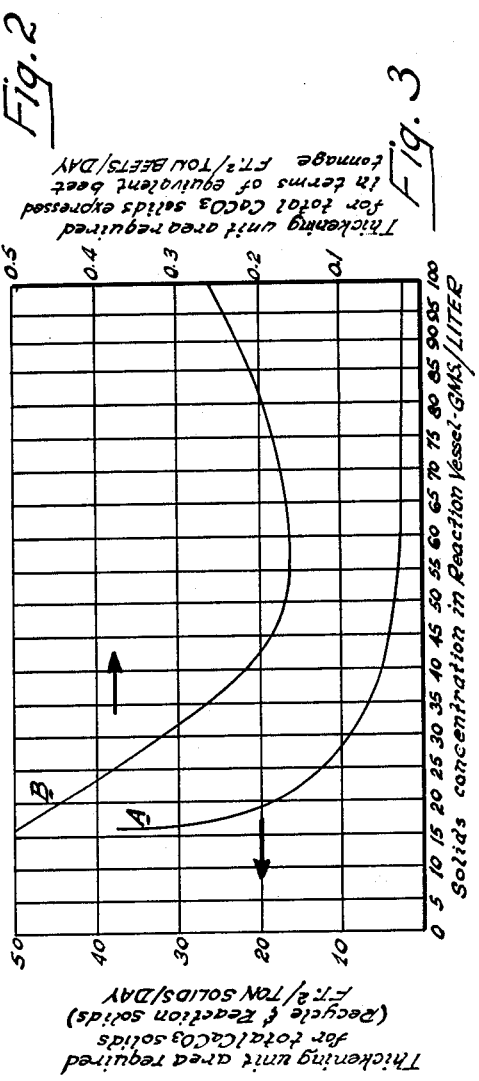

Fig. 2 — Filtering Characteristic Carbonation Sludge Thickener Underflow Concentration Fig. 3 — Thickening unit area required for total $CaCO_3$ solids (Recycle + Reaction solids) $FT^2/TON\ SOLIDS/DAY$ Thickening unit area required for total $CaCO_3$ solids expressed in terms of equivalent beet tonnage $FT^2/TON\ BEETS/DAY$ INVENTOR.
Robert H. Van Note
BY
William S. Henry INVENTOR.
Robert H. Van Note
BY
William S. Henry

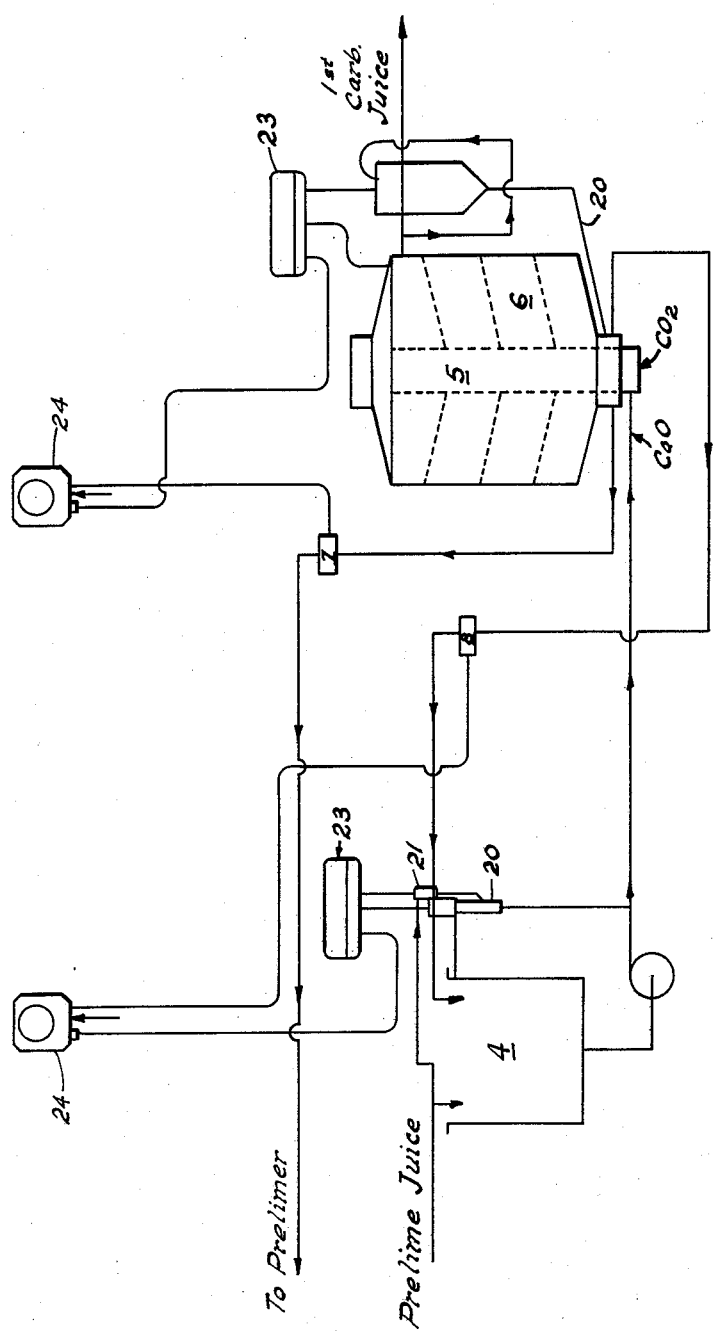

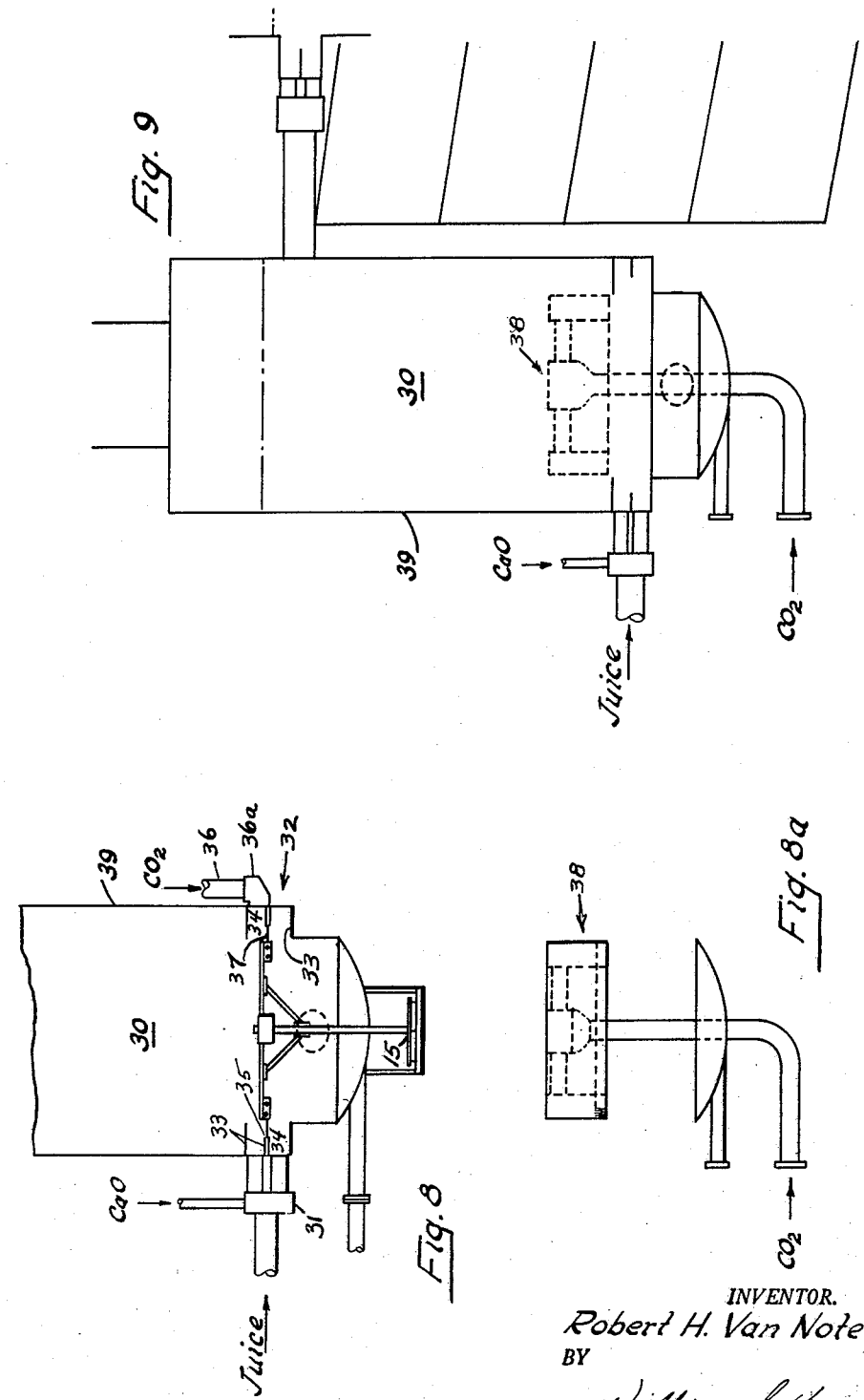

United States Patent Office 3,089,789
Patented May 14, 1963

3,089,789
PROCESS FOR FORMING AND TREATING CALCIUM CARBONATE PRECIPITATES
Robert H. Van Note, Westport, Conn., assignor to Dorr-Oliver Incorporated, Stamford, Conn., a corporation of Delaware
Filed Mar. 23, 1959, Ser. No. 801,161
8 Claims. (Cl. 127—50)

This invention relates to the discovery that calcium carbonate reaction precipitate ($CaCO_3$) at solids concentrations of 50 to 70 grams per liter of mother liquor has improved settling characteristics, i.e. readily settled, thickened and filtered. More particularly, this invention relates to the formation of $CaCO_3$ precipitate in the presence of active $CaCO_3$ seed or primer to form a solids suspension of $CaCO_3$ particles, (comprising seed material and $CaCO_3$ reaction precipitate) within the range 50–70 grams per liter of mother liquor.

An active $CaCO_3$ precipitate is defined as freshly precipitated $CaCO_3$ as distinct from "whiting." Active $CaCO_3$ seed or primer may be precipitate from a previous operation, or separately prepared, and may also be obtained by progressive additions of carbonate to a solution of limed mother liquor wherein the previous reaction precipitate becomes the seed or nuclei for the next successive carbonation such as disclosed in U.S. Patent No. 2,557,800.

The precise phenomena responsible for the high settling rate, thickening concentrations and filterability of $CaCO_3$ particles within the range of 50 to 70 grams per liter, particularly those formed by seeding is not completely understood. It is believed that the improvements in settling characteristics of active $CaCO_3$ precipitate, (normally formed as very fine particles which are characteristically difficult to settle, thicken and filter) is due to increasing the rate of reaction, or driving force for the reaction, by which the precipitate is formed. Increasing the rate of reaction, or forming quickly settling reaction products, is provided by supplying an optimum quantity of active $CaCO_3$ seed or nuclei, with which the reaction-precipitate-coagulates, flocculates or agglomerates, to form relatively large particles. That is, the nuclei hastens the formation of reaction-precipitate with which it also forms a relatively large particle to quickly settle and thicken the reaction precipitate to high concentrations. Accordingly, I have discovered that a maximum rate of reaction for $CaCO_3$ is obtained at 50 to 70 g.p.l.

This invention has utility in any art where it is desired to separate $CaCO_3$ reaction-precipitate from the mother liquor by sedimentation clarification, thickening or filtering. For instance, it can be used in the purification of sugar juice, including beet sugar juice, in water softening, or brine processing, and in the production of white liquor by causticizing green liquor in the art of processing paper pulp.

While the literature on sugar juice purification by liming and carbonating presents a very great number of different processes, whatever the process used, it is inevitable that after "liming" or "defecation" (the chief function of which is "destructive reaction"), $CaCO_3$ must be precipitated with carbonic acid or $CO_2$ to remove impurities. Therefore, while this invention relates most particularly to the carbonation step in liming and carbonating processes for purifying sugar juices, it will also favorably influence the step of "pre-liming" sugar juice so that impurities precipitated with CaO can be readily removed prior to carbonation as hereinafter fully disclosed.

A further feature of this invention is a system for automatically maintaining a 50 to 70 g.p.l. reaction product in a continuous carbonation vessel. Briefly, this system provides control of the quantity of $CaCO_3$ sludge removed from a carbonation thickener i.e. multitray sedimentation thickener or a filter, and supplied to a mixing tank containing the juice to be carbonated, regardless of the density of the thickener sludge. That is, the quantity of $CaCO_3$ recycle will be maintained substantially constant even though the density of the sludge or filter cake may vary radically.

Also forming a part of this invention is a preferred apparatus for carrying out the above-described carbonation process. This apparatus consists essentially of a carbonator-reaction tower in which the juice is subject to carbonation in one pass through the reactor. Prior art carbonators, exemplified by the Dorr and Benning carbonators, recycled previously carbonated juice back to the reaction vessel together with incoming diffusion juice.

Therefore, a primary object of this invention is to provide a process for the production of readily, thickened, settled, and filterable $CaCO_3$ precipitate.

A further primary object of this invention is to provide a continuous sugar juice purification system having greater economies and efficiencies than heretofore while producing maximum quality carbonate juice with respect to purity, color, and lime salts content.

Another primary object of this invention is to provide a one pass carbonation method and apparatus for continuous carbonation of sugar juice.

A further object of this invention is to provide a system particularly suited to carrying out the primary objects of this invention in relation to beet sugar processing.

Another object of this invention is to provide an improved sugar purification process by which increased capacity of clarifiers, thickeners, washers, and filter apparatus is obtained as a result of improved settling, thickening and filtering characteristics of $CaCO_3$ precipitate according to this invention.

A further advantage of the process of this invention resides in reduced settling and thickening area requirements, with the resultant advantage that smaller, less expensive sedimentation thickeners and filters can be used in sugar production. The advantage of reduced detention time in such apparatus results in greater yield and greater impurity eliminations from sugar juice.

Another significant object of this invention is maximum utilization of the improved decantation thickening and filtering characteristics of $CaCO_3$ solids formed or produced at 50–70 g.p.l. In a sugar juice purification process, the improved $CaCO_3$ solids are not only utilized as seed material for the carbonation step but are also utilized in the pre-liming step to produce a high quality pre-limed juice from which most of the impurities have been removed. According to this feature of the invention, $CaCO_3$ produced at 50–70 g.p.l. in the sugar carbonator is thickened and recycled to the prelimer step so that pre-liming is carried out in the presence of these solids and effluent from the prelimer is decanted whereby the settling, thickening and filtering properties of the recycled $CaCO_3$ makes it possible to readily remove impurities from the prelimed juice prior to carbonation thereof. In this way, the juice which is to be carbonated is relatively pure and as a result first carbonate juice is of high quality. Also a relatively clean $CaCO_3$ is produced which readily coagulates, agglomerates or flocculates with the precipitate formed during the preliming step and the carbonation step of a sugar purification process. Therefore, it will be understood from the foregoing that this invention relates to improving the overall process of treating sugar bearing juice.

Another feature and object of this invention is a continuous beet sugar purification system in which a quantity of solids is removed from the first carbonation stage (sedimentation-thickener-sludge or filter cake) which is substantially equal to the quantity of solids present in the carbonator upon completion of the reaction between CaO and $CO_2$. This quantity of solids is split into one portion which is recycled to the carbonator to obtain a solids concentration of 50–70 g.p.l. upon substantial completion of the reaction of CaCO and $CO_2$ therein. The remainder of the quantity of solids removed from the carbonator is delivered to a "prelimer" stage and subsequently removed in a prelime-separator, preferably a sedimentation thickener. The recycled solids in the prelimer act as an aid to sedimentation and filtration of prelime precipitate.

Other objects and advantages together with the foregoing, will be more readily understood from the following detailed descriptions taken with the drawings in which:

FIG. 1 is a graphical illustration of the relationship between settling rates of $CaCO_3$ solids formed in a reaction vessel at various solids concentrations.

FIG. 2 is similar to FIG. 1 and illustrates the relationship between thickening and filtering characteristics of $CaCO_3$ precipitate formed in a reaction vessel at various solids concentrations.

With regard to FIGS. 1 and 2 it is noted that the curve shown therein relates the solids concentration in a reaction vessel (axis of abscissas) to the settling, thickening and filtering characteristic of the reaction contents in a sedimentation thickener (axis of ordinates). The concentration of $CaCO_3$ within the reactor, upon substantial completion of reaction, is settled and thickened to obtain the curves shown in these figures. Also, the curves of FIGS. 1 and 2 were obtained by having active $CaCO_3$ seed material present during the reaction forming precipitated $CaCO_3$.

FIG. 3, curve A, is a graphical illustration of the advantages or results obtained by this invention in the area requirements necessary to settle and thicken $CaCO_3$ solids. Curve B shows these results as related to beet sugar processing in terms of tons of beets/day.

Figure 4:
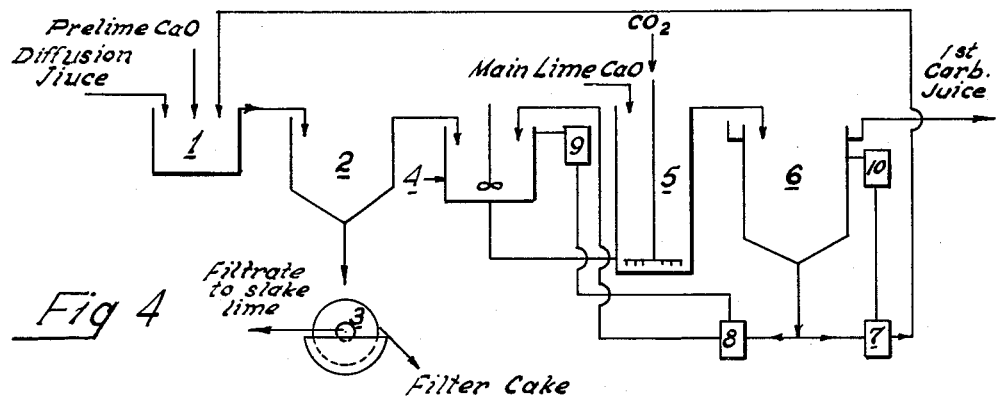
Figure 5:
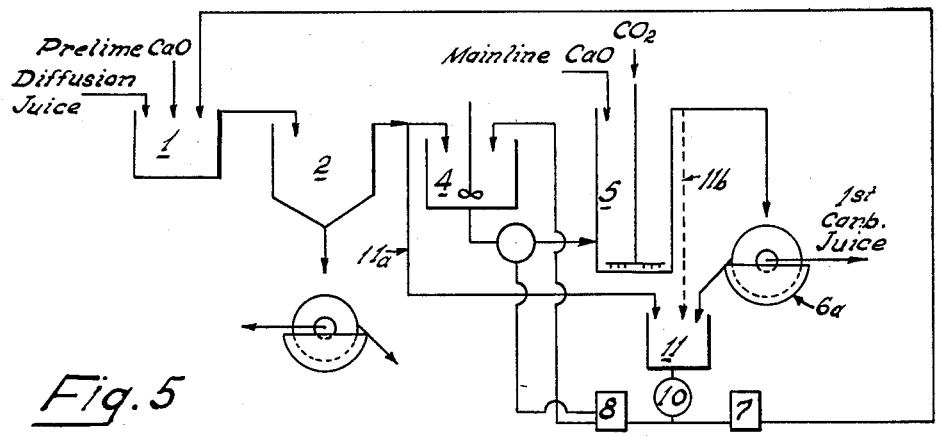

FIGS. 4 and 5 are schematic flowsheets illustrating an improved sugar juice purification process embodying the teachings of this invention.

Figure 6:
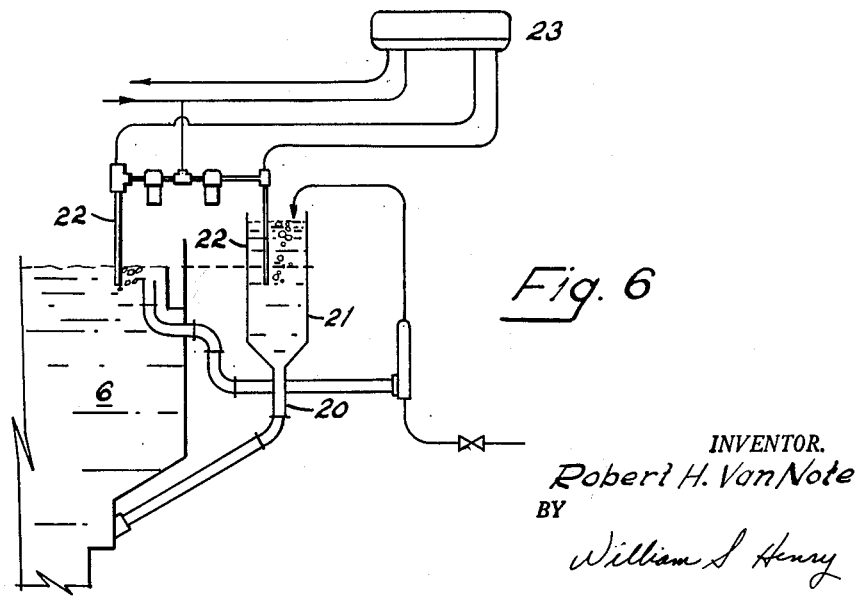

FIGS. 6 and 7 are elevational schematic views of a control system for recycling material to accomplish the objectives of this invention in the flowsheets of FIGS. 4 and 5.

FIGS. 8 and 9 are elevational schematic views of a low detention time, one pass carbonator.

Referring to the drawings, FIGS. 1 and 2 graphically illustrate that maximum settling rates and thickening concentrations for $CaCO_3$ precipitate are obtained at concentrations within the range of 50–70 g.p.l. However, as previously stated, a 50 to 70 g.p.l. concentration obtained by forming $CaCO_3$ precipitate in the presence of active $CaCO_3$ results in the greatest possible settling and thickening characteristic. Therefore, the axis of abscissas of FIGS. 1 and 2 are the concentrations of solids within the reactor which are fed to a sedimentation vessel upon substantial completion of reaction.

With reference to FIG. 2 it is noted that the filterability of $CaCO_3$ is proportional to the concentration of thickened $CaCO_3$. Thus, FIG. 2 also illustrates that maximum filterability of $CaCO_3$ is also obtained at 50 to 70 g.p.l. reactor concentrations.

Another advantage obtained by this invention, in terms of thickening area requirements, is illustrated in FIG. 3.

Curve A of FIG. 3 depicts the unit thickening area requirements for $CaCO_3$ solids formed in the presence of previously precipitated $CaCO_3$ or seed. The solids concentration of the suspension being varied, either by changes in the solids concentration of the newly formed precipitate, or the quantity of $CaCO_3$ seed present during the formation of the new precipitate. Both alkalinity and underflow solids concentrations within the sedimentation thickener are held constant over the entire solids concentration range.

Unit thickening area by definition is the cross-sectional area required to thicken one ton of solids per day from a feed solids concentration to an underflow solids concentration, and is usually expressed in terms of sq. ft. thickening area per ton of solids per day.

Curve A of FIG. 3 shows that unit area requirements are reduced as the concentration of solids increases. However, the reduction in thickening area requirement is not a linear function with respect to solids concentration, since the rate of change becomes less pronounced as solids concentration increases. The physical characteristics of the newly formed and seed solids are identical in every respect as long as some of the seed solids are present during reaction of the chemical constituents which form the new precipitate solids. In other words, regardless of the ratio between new solids formed and seed solids, thickening area requirements will be essentially those depicted in FIG. 3, curve A. That is, thickening area requirements change as the total solids concentration in the reaction vessel is changed. Curve A by itself would suggest that greater solids handling capacities could be gained in thickening apparatus as solids concentration of the feed as increased to infinity. However, optimum thickening conditions are achieved within a total $CaCO_3$ solids concentration range of 50–70 g.p.l. It is true that thickening area requirements decrease with a continual increase in solids concentration in the reaction vessel, but the quantity of total solids per unit volume also increases. As a result, thickening apparatus handling a $CaCO_3$ suspension reaches its maximum capacity when the feed suspension and solids concentration present in the reaction vessel is within the range of 50–70 g.p.l. In the light of the foregoing, it will be seen in sugar juice purification, for example, that only the quantity of lime required to effect maximum purification need be added since an optimum quantity of $CaCO_3$ solids can be recycled to produce maximum settling, thickening, and filtration of the sludge. In this way, lime addition is held to a minimum resulting in an overall savings in the juice purification process.

Curve B, FIG. 3, depicts the phenomena illustrated by curve A for the case of beet sugar juice purification. In this case, unit thickening area requirements are given in terms of the raw material processed; that is, sq. ft. thickening area per ton beets processed per day. Similar curves could be developed showing unit thickening area requirements based on unit weights or volumes of the finished product; that is, tons of carbonated juice per day, gallons per minute of carbonated juice, etc. However, since most calculations in the sugar industry are reduced to a beet capacity ratio, the units of measurement given (ft.²/ton beets/day) are preferred.

It may be shown that the following formula relates unit thickening area requirements, $U.A._S$, in terms of ft.²/ton solids/day to thickening area requirements $U.A._B$, in terms ft.²/ton beets/day.

(1) $$U.A._B = U.A._S \times C_0 \times \frac{1}{1000 \text{ s.g.}} \times d \times tb/da$$

where $C_0$ is the $CaCO_3$ solids concentration in terms of gms./liter; s.g. is the specific gravity of the juice; assumed s.g.—1.06 gms./cc.; $d$=draft, assumed $d=1.26$; $tb/da$=ton beets/day. By definition of unit thickening area, ton beets/day is unity, therefore (1) becomes:

(2) $$U.A._B = .00119 \times U.A._S \times C_0$$

Substituting points from curve A, FIG. 3 into Equation 2, we have:

| $C_0$ | U.A.$_S$ | U.A.$_B$ |
|---|---|---|
| 20 | 18.0 | 0.428 |
| 30 | 8.6 | 0.307 |
| 40 | 4.6 | 0.219 |
| 50 | 2.8 | 0.167 |
| 60 | 2.3 | 0.164 |
| 70 | 2.1 | 0.175 |
| 80 | 2.0 | 0.190 |
| 90 | 1.9 | 0.204 |

Curve B, FIG. 3, is formed by drawing a smooth curve through the points associated with the corresponding values listed in columns 1 and 3 above. This curve gives the actual thickening area required for a given factory under various conditions of precipitation of solids. For example, a factory processing a juice of 1.06 gms./cc. specific gravity, using a draft of 1.26, and adding 1.96% CaO on beets would be operating with 30 gms./liter $CaCO_3$ solids in the carbonator. Under these conditions, 0.307 ft.$^2$ thickening area would be required to handle the juice from each ton beet processed per day. Under the same conditions but with recycling sufficient sludge to increase the $CaCO_3$ solids concentration in the carbonator to 60 gms./liter, the same quantity of juice could be processed in 53.5% of the thickening area. Further increase of the solids concentration in the carbonator to 90 gms./liter, by recycling more solids, would increase thickening area requirements by 24.4% over that optimum for the system. Thus, by practicing the art of sludge recycling within a range such that 50–70 gms./liter $CaCO_3$ solids concentration is maintained within the reaction vessel, thickening apparatus is held to a minimum, thus reducing machine and installation costs. As an added advantage, in sugar juice processing, this also reduces detention time in the process, thereby reducing juice degradation to a minimum.

Thickening area requirements will vary depending upon juice alkalinity, underflow solids concentrations, specific gravity of the juice, factory draft, and the nature and condition of the beets. All of these variables will tend to shift curve B, FIG. 3, vertically up or down. Regardless of these variables, however, the specified solids concentration range of 50–70 gms./liter would be optimum for all operating conditions. Similar calculations and curves could be drawn for brine purification, water treatment, recausticizing, and the like where $CaCO_3$ solids are precipitated and thickened. While units of measurement of thickening area requirements would normally be in gallons per minute of brine, water, and white liquor processed, with actual values being dependent upon variables inherent in each industry, the general shape of the curve would be identical to that of curve B, and maximum capacities would be achieved by maintaining a $CaCO_3$ solids concentration of 50–70 gms./liter in the reaction vessel.

In the case of brine purification and water treatment, as in beet and cane juice purification, normal solids concentration in the reaction vessel and therefore, the feed concentration to a sedimentation tank are lower than the specified optimum solids concentration range. In these cases, then, solids must be recycled to the reaction vessel to maintain the proper solids concentration.

On the other hand, in the precipitation of $CaCO_3$ in the production of white liquor in the recausticizing field, solids concentration in the recausticizers are greater than the optimum range. In this case, the invention teaches recycling a sufficient quantity of white liquor back to the recausticizers such that a solids concentration range of 50–70 gms./liter solids is maintained and fed to the sedimentation tank.

With regard to sugar juice carbonation, the alkalinity of the solutions represented by the graphs shown in FIGS. 1, 2 and 3 is the same as normally associated with first carbonation (approximately 0/1% on beets).

The flowsheet of FIG. 4 illustrates a process for extracting sugar from beets employing the first carbonation teaching according to this invention and utilizing this teaching to favorably influence; (a) preliming of the diffusion juice, (b) clarification of prelimed juice, (c) clarification of the first carbonation juice, and (d) minimizing the detention time of the juice from its introduction into the prelimer through the various stages of treatment until the juice appears as clarified first carbonation juice.

In the embodiment according to FIG. 4, diffusion juice is introduced into prelimer 1 which is preferably, but not necessarily, of the type known as the Brieghel-Muller prelimer (U.S. Patent No. 2,610,929). A Brieghel-Muller prelimer consists essentially of an oblong tank with a semi-circular bottom. The lower or bottom half of the tank is partitioned into a number of cells. A shaft passing through these cells carries stirring arms and paddles located in each cell for mixing the liquid. Above the cells, each partition carries a shaft extending upwards from its center and each of these shafts carries an oblong shutter device of a width equal to that of the tank. Beet juice enters at the top of one end of the tank and leaves from the bottom of the other end of the tank via a constant level overflow pipe extending upwards from the bottom of the last cell. Lime is introduced in the top of the last cell (limed juice exit) and stirrer arms tend to push the liquid from the liming end of the juice inlet end of the tank; the flow through the tank being controlled by the shutters. A degree of mixing juice and lime can thus be achieved whereby constant alkalinity can be maintained in each cell. Milk of lime is gradually added to the prelimer over a period of 15–20 minutes in accordance with the teachings Dedek-Vasatko as disclosed in U.S. Patent 2,007,424. According to the Dedek-Vasatko preliming practice, an optimum quantity of lime is added to a continuously stirred, heated diffusion juice, the lime being added first in small quantities until 0.3 to 0.5 CaO has been added over a period of 15–20 minutes, and the remainder being then added all at once. Carbonated sludge from a carbonation thickener 6 is also introduced into the prelimer, at the juice inlet end thereof, for the purpose of "stabilizing" the juice as disclosed by Brieghel-Muller, U.S. Patent 2,697,049. It is noted that the flowsheet of FIG. 4 is distinct from the Brieghel-Muller "stabilization" concept in that only the solids which are insoluble with CaO are recycled to the prelimer. That is, in the Brieghel-Muller "stabilization" concept limed diffusion juice is carbonated without first removing non-sugar solids which are rendered insoluble with CaO. Therefore, the recycled sludge from the carbonation thickener has all the impurities contained in the diffusion juice. According to the flow sheet of FIG. 4, all the impurities insoluble with CaO are removed from juice by the prelime thickener 2. As a result, solids recycled to the prelimer, according to this invention, is relatively clean $CaCO_3$.

A further distinction between the flowsheet of FIG. 4 and prior art practices, including Brieghel-Muller "stabilization," is as follows:

Sludge recycled from the carbonation thickener 6 to the prelimer is not returned to the carbonator 5 and thence returned to the carbonator thickener 6. The recycled sludge, according to FIG. 4, is removed from a system by thickener 2 prior to carbonation thus preventing impurities going back into solution in main-liming and/or carbonation to increase the color and decrease purity of the first carbonation juice overflowing from thickener 6. Also, the recirculating load is minimized because it is withdrawn from the system close to its point of introduction.

The stabilized, prelimed diffusion juice is conducted to a prelime-sedimentation-thickener 2 of the multi-tray type, to remove non-sugars rendered insoluble by CaO. Recycled $CaCO_3$ aids settling of non-sugar impurities entering thickener 2. Underflow from thickener 2 is filtered at 3 wherein the recycled $CaCO_3$ now acts as a filter aid to facilitate separation of the otherwise slimy, difficult to filter solids, formed by non-sugar impurities rendered insoluble by CaO. Filtrate from filter 3 is used to slake-lime and produce CaO as is well-known.

Clarified prelimed juice overflowing thickener 2 is mixed with the relatively clean $CaCO_3$ sludge from carbonation-thickener 6, together with main-lime CaO (normally in the range of 1.5 to 2.25 CaO on beets). Preferably, main-liming is accomplished just before or substantially simultaneous with the introduction of $CO_2$. The quantity of recycled $CaCO_3$ is determined by the quantity of $CaCO_3$ to be precipitated in vessel 5 by reacting CaO and $CO_2$. Generally, the quantity of CaO and $CO_2$, and therefore, $CaCO_3$ precipitate produced by this reaction is determined by the quality of the beets to be processed as is well-known. Therefore, the quantity of recycled sludge entering mix tank 4 must be equal to the quantity of solids necessary to obtain 50–70 g.p.l. upon substantial completion of reaction in vessel 5. For example, if CaO and $CO_2$ introduced to reactor 5 will produce 30 g.p.l. reaction $CaCO_3$ then 20 to 40 g.p.l. recycled $CaCO_3$ is delivered to mix tank 4. As a result a 50 to 70 g.p.l. solids suspension is obtained in reactor 5 upon completion of the reaction which is conducted, at this concentration range, to a carbonation-thickener 6. Therefore, the suspension entering thickener 6 at 50 to 70 g.p.l. obtains optimum decantation and thickening with minimum detention. Further, it is well-known that improved juice quality can be obtained at high alkalinities but at high alkalinities it is difficult to separate the precipitates from the juice. Due to the improved decantation and filtering characteristics of $CaCO_3$ produced at 50–70 g.p.l. as hereinabove described, it is now possible, as a practical matter, to utilize high alkalinities of pre-limed and first carbonate juice without experiencing difficulties with separation of the solids from said juice.

Carbonator 5 may be of the well-known Benning or Dorr type but is preferably of the one pass, low detention type carbonator shown in FIGS. 8 and 9.

As shown in FIG. 4, a mix-tank density controller 9 regulates the capacity of pump 8 to maintain constant a predetermined ratio of juice to $CaCO_3$ seed material within the tank 4. The density controller is manually variable to determine the juice to seed ratio according to the quality and quantity of beets being processed and other known variables. The density control system 9 may be of any known type which pneumatically, electrically or mechanically varies the opening of a valve or the capacity of a positive displacement pump. A system suitable for use as a density controller 9 is disclosed in FIG. 6 and FIG. 7 hereinafter described.

To prevent recycling carbonated juice and have an available source of $CaCO_3$ seed material for the carbonator and/or prelimer, it is necessary to maintain a sludge reserve or inventory within the carbonation-thickener 6. Once the thickened sludge builds up within the bottom of the thickener 6, it is maintained at a predetermined level by a sludge inventory control 10 which regulates or controls the capacity of pump 7. Pump 7 and associated conduits deliver sludge from thickener 6 to the prelimer 1. As a result, once a sludge inventory has been established during "start-up," the inventory 10 and pump 7 maintain this inventory by removing only an amounts of solids equal to the newly formed solids transferred to thickener 6 from carbonator 5.

As a result of the action of control 9 and pump 8, a solid suspension upon completion of reaction within the carbonator 5 will be maintained within the 50–70 g.p.l. range. It will be observed that by this arrangement, a supply of sludge for recycle to mix-tank 4, and/or to the carbonator 5, is insured by the operation of the inventory control 10 which will reduce the capacity of pump 7 before the sludge required by the carbonator can be depleted. However, when starting up operations have been completed, the quantity of solids sent to the prelimer 1 by pump 7 is substantially equal to the amount of solids entering the thickener 6, less the sludge required by mix-tank 4 as determined by the density controller 9 and pump 8 controlled thereby.

FIG. 5 shows a flowsheet differing from flowsheet of FIG. 4 in that a rotary drum filter 6a replaces the sedimentation unit 6 of FIG. 4. As shown in FIG. 5, carbonated juice and the solids suspended therein are fed to a rotary drum filter 6a where the solids are separated from the first carbonated juice reporting as filtrate. The filter cake is discharged from the drum in the usual manner and is preferably transferred to a mix-tank 11 to be reslurried with clarified predefecation juice 11a from thickener 2. Reslurried filter cake is pumped to a mix-tank 4 as above described by a pump 8 which is controlled by a mix-tank controller 9. Pump 7 transfers the remaining filter cake suspension from the tank 11 back to the prelimer as heretofore disclosed. Pump 7, in this arrangement, can be regulated according to the position of a float in tank 11 or in suitable known manner. Alternatively carbonated juice 11b from reactor 5 may be used to reslurry the filter cake or the filter cake may be recycled without reslurring if desirable.

*Examples of Maintaining Correct Balance of Solids Concentration at Carbonation Station by the Recycle of Thickener Underflow*

*Example 1.*—A factory slicing 3000 tons beets/day having a draft of 1.30 uses 1.5% CaO on beets.

Raw juice flow:

$$3000 \frac{tb}{da} \times \frac{da}{1440 \text{ min.}} \times \frac{1.30 \text{ tons juices}}{tb}$$
$$\times \frac{2000\#}{\text{ton juice}} \times \frac{\text{gal.}}{8.84\#} = 615 \text{ g.p.m.}$$

Lime used:

$$3000 \times .015 \times \frac{2000}{1440} = 62.5\# \text{ CaO/min.}$$

$CaCO_3$ produced:

$$62.5 = \frac{100}{56} = 111.5\# \text{ CaCO}_3/\text{min.}$$

$CaCO_3$ concentration:

$$\frac{111.5\#}{615 \text{ gal.}} = .181 \frac{\#}{\text{gal.}}$$

It is desired to have a solids concentration of 50–70 gms./liter $CaCO_3$ solids at the carbonation station. Say:

$$\frac{60 \text{ gms.}}{\text{liter}} \text{ or } \frac{60 \text{ gms.}}{\text{liter}} \times \frac{3.785 \text{ liter}}{\text{gal.}} \times \frac{\#}{454 \text{ gms.}} = 0.50 \frac{\#}{\text{gal.}}$$

Therefore $0.50 - 0.181 = 0.319\#/\text{gal.}$ $CaCO_3$ should be recycled in the form of thickener underflow. In this case, $0.319 \times 615 = 196\#/\text{min.}$ $CaCO_3$ would be recycled or a ratio of recycled $CaCO_3$ to new $CaCO_3$ equal to 1.76:1.

Assuming the $CaCO_3$ concentration of the thickener underflow is 300 gms./liter or 2.50#/gal., $$\frac{196}{2.50} = 78.5 \text{ gal./min.}$$

of underflow would be recycled. Of this volume, $$\frac{196}{22.5} = 8.7 \text{ gals.}$$

are occupied by solids and $78.5 - 8.7 = 69.8$ gals. of juice are recycled. Thus, quantity of juice recycled in this case would be $$\frac{69.8}{615} \times 100 = 11.3\%$$

of raw juice. Present standard continuous carbonation means recycle a quantity of carbonated juice equivalent to 700–900% of raw juice while producing solids which require greater thickener capacity to separate.

Since considerably less quantities finished first carbonation juice are recycled, degradation of the juice going to further processing is held to a minimum.

*Example 2.*—Conditions equal to those of Example 1 except that 2.25% CaO on beets is used.

Raw juice flow: 615 g.p.m.

Lime used:

$$3000 \times .0225 \times \frac{2000}{1440} = 94.0\# \; CaO/min.$$

$CaCO_3$ produced:

$$94.0 \times 100 = 168\# \; CaCO_3/min.$$

$CaCO_3$ concentration:

$$\frac{168}{615} = 0.274 \#/gal.$$

$0.500 - 0.274 = 0.226 \#/gal.$ $CaCO_3$ should be recycled in the form of thickener underflow. $0.226 \times 615 = 139\#/min.$ $CaCO_3$ recycle. Ratio of recycled $CaCO_3$ to new $CaCO_3$ equal to 0.83:1. Assuming 2.50#/gal. $CaCO_3$ in underflow $$\frac{139}{2.50} = 55.7 \; gal./min. \; underflow \; recycled$$

$$55.7 - \frac{139}{22.5} = 49.5 \; gals. \; of \; juice \; recycled$$

$$\frac{49.5}{615} \times 100 = 8.1\% \; raw \; juice \; recycled$$

A further discovery according to this invention as illustrated in FIGS. 4 and 5 relates to the temperatures at which the juice is prelimed and carbonated. It is known in the sugar industry that juice temperatures effect both decantation and/or filtration as well as juice quality. At high temperatures (approximately 95° C.) a poorer quality juice is produced than at lower temperatures (approximately 55° C.). However, the high temperatures are used because it is commercially impractical to separate the solids at the low temperatures. Due to the improved decantation and filtration of $CaCO_3$ produced in a carbonator at 50–70 g.p.l., it is now feasible to use low temperatures in sugar production for selective removal of impurities.

A pilot plant utilizing the flowsheet as given in FIG. 4 was operated experimentally at a U.S. beet sugar factory. The invention of maintaining a calcium carbonate solids concentration of 50–70 g.p.l. in a single pass carbonator was practiced. Factory operation consisted of (1) carbonating the diffusion juice in a standard Dorr-type carbonator with 700% recirculation of treated juice at temperatures of 70°–80° C.; (2) splitting the juice after carbonation into two streams; one stream being filtered on Kelly filters, the other stream clarified in a Dorr thickener.

Samples were collected of the pilot plant effluent, the Kelly filter filtrate, and the Dorr thickener overflow. These samples were analyzed by standard laboratory methods to determine the apparent purity, color and saponin content of each. Because of the variance within each set of data, statistical methods were employed to determine if the differences in the averages between any two sets of data were significant. In this type of work, differences are assumed statistically significant when confidence levels of 95% or greater are reached. At a 95% confidence level, odds are 19:1 that any difference found is not due to chance. An increase in the magnitude of these odds permits greater confidence in the data.

Results of operation are given below. These results represent operation under controlled conditions, the only variable changed in pilot plant operation being temperature. It is shown from these results that, (1) The lower the temperature at the preliming step within practical limitations of factory operation, the greater is the removal of coloring matter and saponin in the process.

(2) The higher the temperature at the preliming step with practical limitations of factory operations, the greater is the purity rise or total impurity removal in the process.

The two extremes in temperature at the preliming step each favor the removal of certain impurities which are important to the economics of sugar making. Low temperature preliming selectively removes coloring matter and saponin. Both of these two types of impurities are important to the quality of sugar produced. If either of these remain too high in concentration after carbonation of the juice, the sugar produced from this juice might be of inferior quality and its price on the market reduced considerably. On the other hand, high temperature preliming removes a greater quantity of total impurities. The greater the removal of impurities through carbonation, the greater will be the recovery of crystallized sugar in subsequent processing. This greater recovery increases the total revenue gained by a sugar company and thus makes the processing of sugar more economical.

A compromise therefore must exist in choosing the correct temperature for preliming. The temperature chosen at preliming will depend upon the mode of operation and equipment used in subsequent steps in sugar processing. Hence, temperatures at preliming may range from 55° C. to 80° C. depending upon the factory in which the process is used.

*Results of Pilot Plant Operation Compared With Normal First Carbonation Factory Operation*

I. *Low temperature preliming.*—Temperature maintained at 55°–60° C. during preliming and subsequent step of clarification of prelimed juice. Thereafter, temperature increased to 70° C. during carbonation.

(*a*) Comparing pilot plant effluent with direct filtration of factory first carbonation juice using Kelly filters:

(1) Apparent purity—0.28 point higher in pilot plant effluent. Difference was highly statistically significant—odds that difference was not due to chance were 40:1.

(2) Color—14.6% less coloring matter in pilot plant effluent. Odds that difference was not due to chance were 999:1.

(3) Saponin content—33.8% less saponin in pilot plant effluent. Odds that difference was not due to chance were 99:1.

(*b*) Comparing pilot plant effluent with clarification of factory first carbonation juice using Dorr thickener:

(1) Apparent purity—0.29 point higher in pilot plant effluent. Odds that difference was not due to chance were 40:1.

(2) Color—30.2% less coloring matter in pilot plant effluent. Odds that difference was not due to chance were 999:1.

II. *High temperature preliming.*—Temperature maintained at 70°–80° C. throughout preliming and carbonation steps of process.

(*a*) Comparing pilot plant effluent with direct filtration of factory first carbonation juice using Kelly filters:

(1) Apparent purity—0.63 point higher in pilot plant effluent. Odds that difference was not due to chance were 200:1.

(2) Color—11.5% more coloring matter in pilot plant effluent. Odds that difference was not due to chance were 200:1.

(3) No statistically significant difference in saponin content of two juices.

(*b*) Comparing pilot plant effluent with clarification of factory first carbonation juice using Dorr thickener.

(1) Apparent purity—0.72 point higher in pilot plant effluent. Odds that difference was not due to chance were 200:1.

(2) Color—6.9% less coloring matter in pilot plant effluent. Odds that difference was not due to chance were 200:1.

A detailed description of one type of arrangement for controlling the sludge recycle to prelimer and carbonator according to the flowsheet of FIG. 4 is illustrated in FIGS. 6 and 7. The instruments illustrated are well known stock items and therefore only a brief description thereof will be given. With reference to FIG. 6, it will be seen that thickener 6 is provided with a stand pipe 20 communicating the thickener sludge sump with a super elevation pipe 21. Clear juice from the thickener overflow is fed to the super elevation pipe in any suitable manner. A pair of air bleed tubes 22, having their open ends in the same horizontal plane sense the difference in density between thickener overflow and thickener underflow. This difference is sensed by a pneumatic differential pressure transmitter 23 which signals a sludge inventory recorder and pump controller 24 whereby a sludge inventory is maintained in thickener 6. An essentially identical arrangement is utilized in controlling pump 8 to maintain a predetermined juice to seed ratio in mix-tank 4.

A suitable transmitter 23 and controller recorder 24 are manufactured by Taylor Instrument Corp. of Rochester, New York, and are fully described in Taylor Bulletins 98258 and 98158. A similar control system is also disclosed in U.S. Patent 2,715,463.

The apparatus illustrated in FIGS. 8 and 9 is a one pass carbonator particularly advantageous for carbonating beet sugar juice. In the foregoing Example 1, it was noted that present standard continuous carbonation apparatus recycled a quantity of carbonated juice equivalent to 700–900% of the raw juice thereby considerably increasing detention time. The apparatus illustrated in FIGS. 8 and 9 decreases the percent of raw juice recycled from 700–900% to 8 to 12%. Relative to prior practices, the carbonator shown is substantially a one pass carbonator. Reference 30 generally designates the one pass carbonator to which diffusion or predefecation juice is supplied by suitable piping and where the process of this invention is utilized active $CaCO_3$ is mixed with the juice. CaO is added in chamber 31 and the lime juice split into substantially equal volumes to be introduced tangentially on opposite sides of a cylindrical mixer 32, adjacent the bottom of the carbonator. Mixer 32 has radially, inwardly extending flanges 33 which define circulating raceways 34. The juice enters the raceways at opposite sides and flows counter currently therein. The juice is displaced radially inwardly into an annular area where the liquid discharging from the raceways is intimately mixed by the eddies created upon impact of the two opposite by direct streams. $CO_2$ is fed into this annular zone of turbulence by a circular gas port 35 between the raceways. $CO_2$ is fed to port 35 by a gas line 36 and distributing header 36a. The port 35 is maintained free of scale by one or more rotating scraper blades 37 which overcomes carbonator scaling problems so that the carbonator of FIG. 8 can be run continuously without shut-down for descaling.

While the arrangement of FIG. 8 is preferred a conventional $CO_2$ distributor 38 may also be utilized as shown in FIG. 8a and FIG. 9.

The reaction between CaO and $CO_2$ is carried out in the carbonator tower 39 during ascent of the carbonator contents and is substantially completed before discharge into a sedimentation thickener.

I claim:
1. A continuous process of treating sugar juice which comprises preliming the juice to remove impurities reacting with CaO, clarifying said prelimed juice to remove said reacted impurities therefrom as sludge, subjecting said clarified juice to further purification by main-liming and carbonation to produce $CaCO_3$ suspension precipitating other impurities along with $CaCO_3$, separating the suspended solids including said $CaCO_3$ from the carbonated juice, recycling a first portion of said separated solids as seed material to the carbonation treatment step at a rate such as to obtain a suspension of active carbonate in a range from about 50 to about 70 grams/liter concentration upon substantial completion of the reactions between CaO and $CO_2$, and recycling a second portion of the separated solids as seed material to the preliming step to be removed from the prelimed juice and from the system in said sludge, whereby the recycle carbonate is maintained at high purity, and adapted for effective separation from the carbonated and the prelimed juice at said carbonate concentration.

2. The process according to claim 1, wherein said sludge is subjected to mechanical separation of the impurities from juice aided by the presence of said carbonate.

3. The process according to claim 1, wherein said sludge is subjected to continuous filtration to separate the impurities from juice, said filtration being aided by the presence of said carbonate.

4. The process according to claim 1, wherein the temperature of the juice treated in the preliming step and the associated clarification step is maintained within a range from about 55° C. to about 80° C.

5. The process according to claim 1, wherein the quantity of said solids recycled to the preliming step is equal to the quantity of solid suspended in said carbonated juice upon completion of the reaction in said carbonation step.

6. The process according to claim 1, wherein said main-liming and said carbonation of the clarified juice are effected simultaneously.

7. The process according to claim 1, wherein said sludge is subjected to continuous filtration to separate the impurities from the juice, said filtration being aided by the presence of said carbonate, and utilizing the filtrate liquid for slake-liming in the production of CaO.

8. A method of continuously carbonating defecated sugar juice comprising continuously introducing active $CaCO_3$ seed to said juice, flowing said seeded juice through a vessel, introducing $CaCO_3$ precipitate forming reactants to said vessel substantially simultaneously with the step of agitating said mixture, said reactants and seed forming a suspension of about 50 to about 70 grams of solids/liter in said juice, continuously separating said solids from said carbonated juice and recycling only said solids as said active $CaCO_3$ seed to said defecated juice at a rate such that the quantity of recycled carbonate is equal to a supplemental quantity required to establish said concentration of about 50 to about 70 grams/liter upon substantial completion of the reaction between CaO and $CO_2$.

References Cited in the file of this patent

UNITED STATES PATENTS

| | | |
|---|---|---|
| 958,907 | Coombs | May 24, 1910 |
| 1,517,499 | Fleener | Dec. 2, 1924 |
| 1,533,033 | Sauer | Apr. 7, 1929 |
| 1,922,411 | Zitkowski | Aug. 15, 1933 |
| 2,538,802 | Schur et al. | Jan. 23, 1951 |
| 2,547,298 | Wiklund | Apr. 3, 1951 |
| 2,557,800 | Seailles | June 19, 1951 |
| 2,592,907 | Kahn | Apr. 15, 1952 |
| 2,617,711 | McAllister | Nov. 11, 1952 |
| 2,668,749 | McHan | Feb. 9, 1954 |
| 2,694,631 | Richter | Nov. 16, 1954 |
| 2,697,049 | Brieghel-Muller | Dec. 14, 1954 |
| 2,760,888 | Bonath | Aug. 28, 1956 |
| 2,774,693 | Muller | Dec. 18, 1956 |

OTHER REFERENCES

Chem. Abs., vol. 51, p. 13429h, September-October 1957. (Copy in P.O.S.L.)

Ware: Beet Sugar Mfg. and Refining, vol. 1, 1905, John Wiley & Sons, N.Y., pp. 355–357. (Copy in Div. 43.)